XR 3,800,223

United States Patent [19]

Mead

[11] 3,800,223

[45] Mar. 26, 1974

[54] AUDIENCE SURVEY SYSTEM

[75] Inventor: Hansel B. Mead, Melbourne, Fla.

[73] Assignee: Teltronic Systems, Inc., New York, N.Y.

[22] Filed: May 4, 1973

[21] Appl. No.: 357,177

Related U.S. Application Data

[63] Continuation of Ser. No. 138,099, April 28, 1971, abandoned.

[52] U.S. Cl. .................... 325/31, 325/65, 325/335

[51] Int. Cl. .................... H04b 1/00

[58] Field of Search .............. 325/31, 65, 322, 325, 325/332–335, 341, 346, 363, 364, 416, 417, 420, 422

[56] References Cited

UNITED STATES PATENTS 2,977,465 3/1961 Sanders et al. .................... 325/335

*Primary Examiner*—Albert J. Mayer
*Attorney, Agent, or Firm*—LeBlanc & Shur

[57] ABSTRACT

Disclosed is a monitor for ascertaining the listening habits of television receiver users. The monitor includes one or more channels provided with a single pass band window or slot that is swept at a constant rate but stopped when a television local oscillator signal enters the window. If the signal remains in the window for a predetermined time, the signal is counted and the sweep continued. As a result, the total sweep rate or time is variable. By switching in a signal suppressor when the swept oscillator output reaches predetermined frequencies, it is possible to work closer in to strong FM signals from FM broadcast stations.

17 Claims, 14 Drawing Figures

INVENTOR
HANSEL B. MEAD
BY Le Blanc and Shur
ATTORNEYS.

INVENTOR
HANSEL B. MEAD

BY *LeBlanc and Shur*

ATTORNEYS.

INVENTOR
HANSEL B. MEAD

BY LeBlanc & Shur
ATTORNEYS.

INVENTOR
HANSEL B. MEAD
BY LeBlanc and Shur
ATTORNEYS.

INVENTOR
HANSEL B. MEAD
BY Le Blanc and Shur
ATTORNEYS.

INVENTOR
HANSEL B. MEAD

BY Le Blanc and Shur

ATTORNEYS.

INVENTOR
HANSEN B. MEAD
BY Le Blanc and Shur
ATTORNEYS.

INVENTOR
HANSEN B. MEAD

BY Le Blanc and Shur
ATTORNEYS.

INVENTOR
HANSEL B. MEAD

BY Le Blanc and Shur
ATTORNEYS.

INVENTOR
HANSEL B. MEAD
BY
ATTORNEYS.

INVENTOR
HANSEL B. MEAD

BY Le Blanc and Shur

ATTORNEYS.

INVENTOR
HANSEL B. MEAD

BY LeBlanc and Shur

ATTORNEYS.

AUDIENCE SURVEY SYSTEM

This is a continuation of application Ser. No. 138,099, filed Apr. 28, 1971, now abandoned.

This invention relates to an audience survey system for ascertaining the listening habits of ratio and television users and, more particularly, is directed to a system for detecting and counting signals from the local oscillators of conventional television receivers in order to ascertain the television channels to which the receivers may be tuned. Important features of the present invention include the provision of an audience survey system that is less sensitive to interference and particularly to interference in the lower frequency channels from frequency modulation broadcast stations. The increase in sensitivity is brought about by a novel combination of variable rate scanning in conjunction with large FM signal suppression.

In assignee's U.S. Pat. No. 3,299,355, there is disclosed a system and method for monitoring radio and television receivers which for the first time rapidly acquires information in very large quantities. This overcomes the difficulties and disadvantages encountered in some other types of systems which rely for their results on a very small sample of the receiving sets actually being used in any given locality. The system of the patent is particularly designed for use in aircraft, but may also be used on a tower in conjunction with a rotating antenna at the receiver which rotates or otherwise sweeps over the area to be monitored. A system particularly constructed for tower operation is shown and described in assignee's U.S. Pat. No. 3,534,265. In those systems, the monitor accomplishes the TV counting process by sweeping (electronic tuning) a moving frequency slot across the band spread of 3 to 4 MHz occupied by the TV local oscillator signals from sets tuned to the same transmitting TV station. The systems resolve between local oscillator signals (sets) by the small differences in frequency between those local oscillator signals. It is generally accepted that the television set local oscillator signals are not inherently frequency stable and, in fact, the frequency can be moved by the TV fine set tuing adjustment over a 3 to 4 MHz range, i.e., usually about 3.5 MHz. Thus, the probability of any two sets being tuned to exactly the same frequency is extremely small.

In assignee's U.S. Pat. No. 3,456,192, there is disclosed a modified audience survey system in which the local oscillator signals for each channel are fed to a comb filter supplying two parallel signal transmission paths feeding a binary logic-type decision circuit. The result is that each monitor channel is provided with a pair of spaced moving frequency slots through which the incoming local oscillator signals may pass to increase the ability of the monitor to distinguish between local oscillator signals very close in frequency and reducing the number of signals lost to interference and noise.

The above-described systems rely to a substantial extent on blanking the minotir channels at predetermined intervals to reject interference signals from FM transmitting stations. It has been found that this results in a significant loss of local oscillator signals and inaccuracy of the count, particularly for the lower VHF television channels such as channels 2 and 3. That is, the TV local oscillator signals for television channels 2 and 3 are located in the FM entertainment frequency band. The band for channel 2 is 99–103 MHz and for channel 3 is 105–109 MHz. The FM broadcast signals are both large in signal strength and, due to the type of modulation, occupy a good deal of band width. In the process of detecting small received television local oscillator signals, the large FM signals can cause a great deal of error in that they can overload and desensitize the monitor receiver. While the monitor receiver can be blanked or inhibited at predetermined times when the sweep tuning is coincident with known FM station transmitting frequencies, while the monitor is in the inhibit condition, it likewise cannot count local TV oscillator signals. This can become a problem in large metropolitan areas, including many relatively powerful FM transmitting stations in that too much local oscillator signal count may be lost.

These and other problems are substantially reduced by the system of the present invention in which the monitor is provided with one or more channels combining a variable rate sweep with large signal suppression. While the system of the present invention will be particularly described as applicable to monitor channels for TV channels 2 and 3 where the problem is most severe, it is understood that the present invention is equally applicable to all the monitor channels.

In the present invention, one or more monitor channels are provided with a swept local oscillator such that the channel provides a variable frequency slot or window 8 KHz wide that is swept or scanned over a spectrum having a width of 3.5 MHz. The sweep speed of the swept oscillator is 8 KHz per msec. The response time of the detector/decision circuit, including filter delay for the single moving slot monitor channel fo the present invention, is approximately 0.5 msec. If the sweep oscillator were swept at a constant rate, signals would appear in the window for 1.0 msec. However, in the present invention, after 0.5 msec. (the delay time), the sweep is made to stop and the signal remains centered in the pass band window for as long as the sweep is in the hold condition. A timer is started during the hold and if the signal remains in the window for 6 msec., the decision circuit registers a count and commands the sweep start tuning to the next signal. If the signal does not remain in the window for 6 msec., then everything is cleared, the sweep starts and no count is registered. The length of time of a complete scan in the present invention is variable, i.e., a function of how many times and for how long the sweep was in the hold condition.

The above-described variable sweep rate of a single window is combined in the present invention with an FM signal suppressor which suppresses larger strength FM signals. It complements the variable sweep rate because it reduces the signal strength of FM signals while having little affect on smaller CW (local oscillator) signals. This process reduces the carrier by some 40 db. while reducing the far outside bands by some 25 to 30 db. However, the detection process has little problems in the far outside bands and switching in the suppressor while processing in the spectrum of a large FM signal substantially reduces error and lessens the amount of required spectrum to be inhibited.

It is therefore one object of the present invention to provide an improved audience survey system.

Another object of the present invention is to provide an improved monitor for monitoring the listening habits of radio and television users.

Another object of the present invention is to provide an improved television audience monitor having one or more channels exhibiting increased insensitivity to interfering signals.

Another object of the present invention is to provide a TV local oscillator monitor receiver having improved noise rejection, particularly with respect to interfering signals from FM stations.

Another object of the present invention is to provide an improved television audience survey monitor having increased noise rejection, particularly to interference in channels corresponding to the lower channels of a TV receiver.

Another object of the present invention is to provide an audience survey monitor in which one or more of the monitor channels incorporates a single variable frequency slot or window that is swept over the local oscillator frequency band at a variable rate in combination with large signal suppression.

Another object of the present invention is to provide an audience survey monitor in which one or more of the monitor channels is provided with a variable frequency swept window which stops and holds on a received signal for a predetermined length of time so as to provide a more accurate local oscillator signal count.

These and further objects and advantages of the invention will be more apparent upon reference to the following specification, claims, and appended drawings, wherein:

Figure 1:
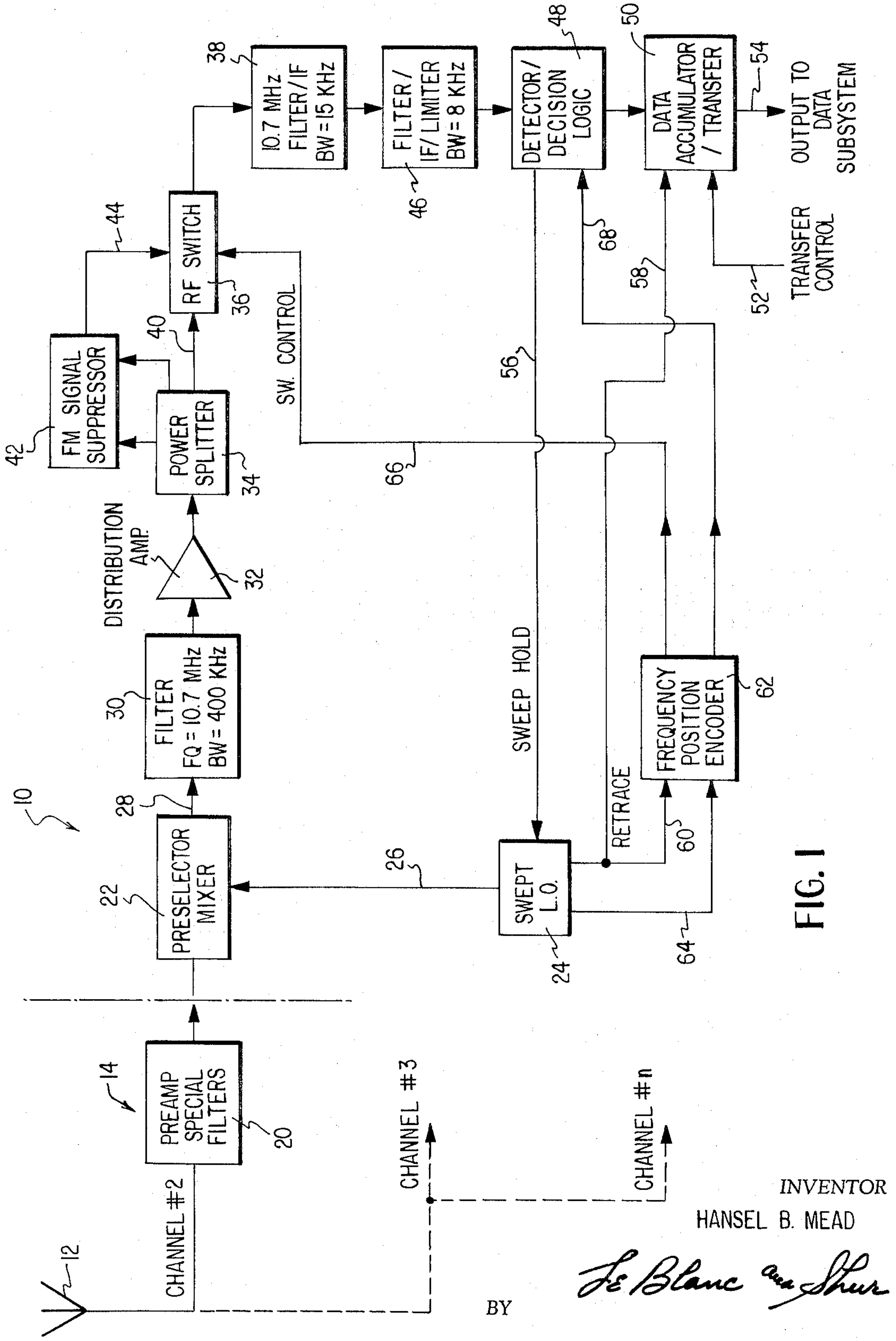
FIG. 1 is a block diagram of a portion of a television audience survey monitor constructed in accordance with the present invention.
Figure 2:
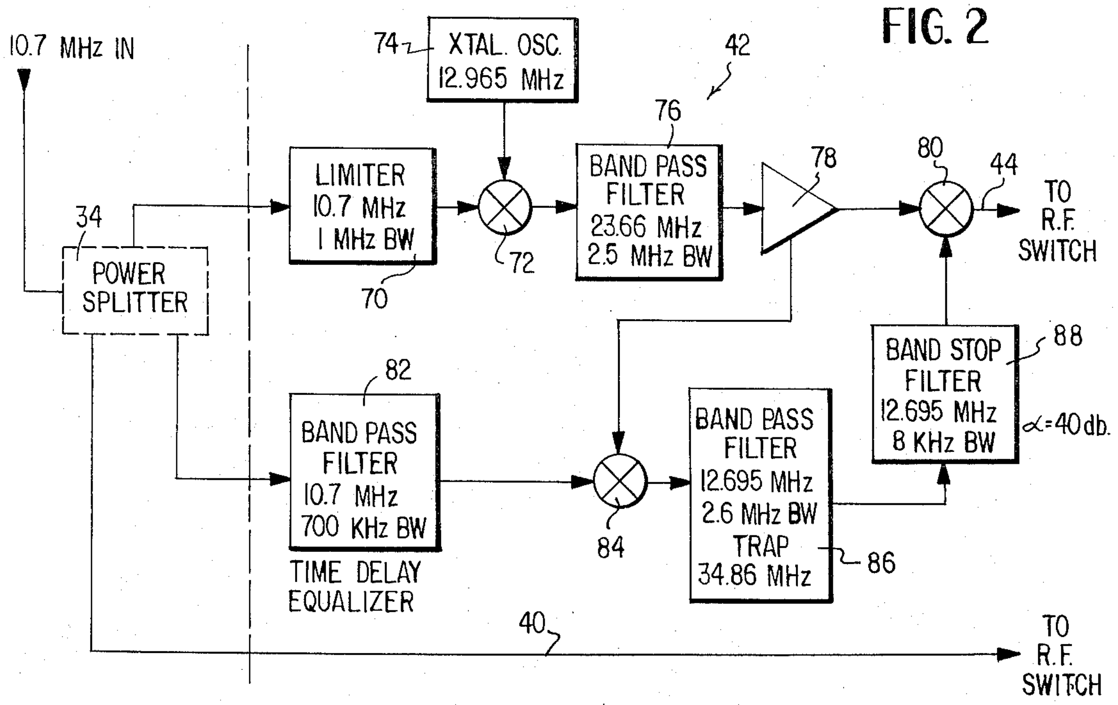
FIG. 2 is a block diagram of an FM signal suppressor incorporated in one or more of the channels of the system of FIG. 1.
Figure 5:
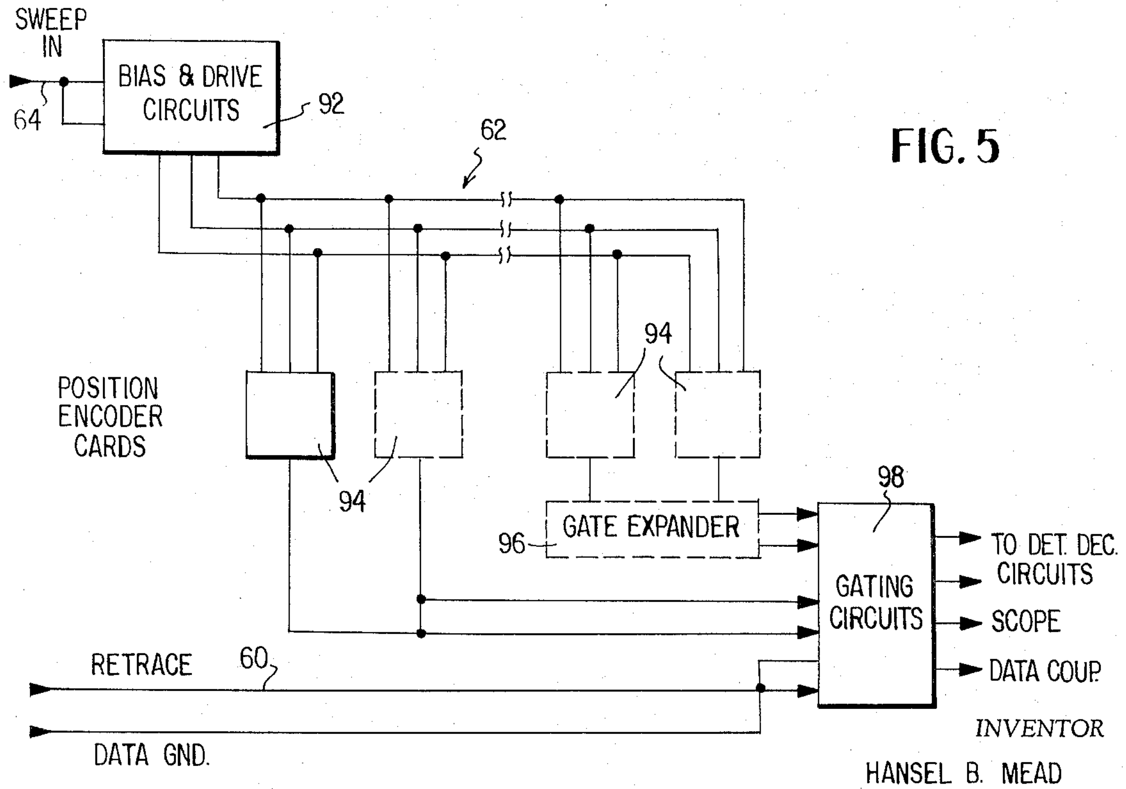
Figure 4A:
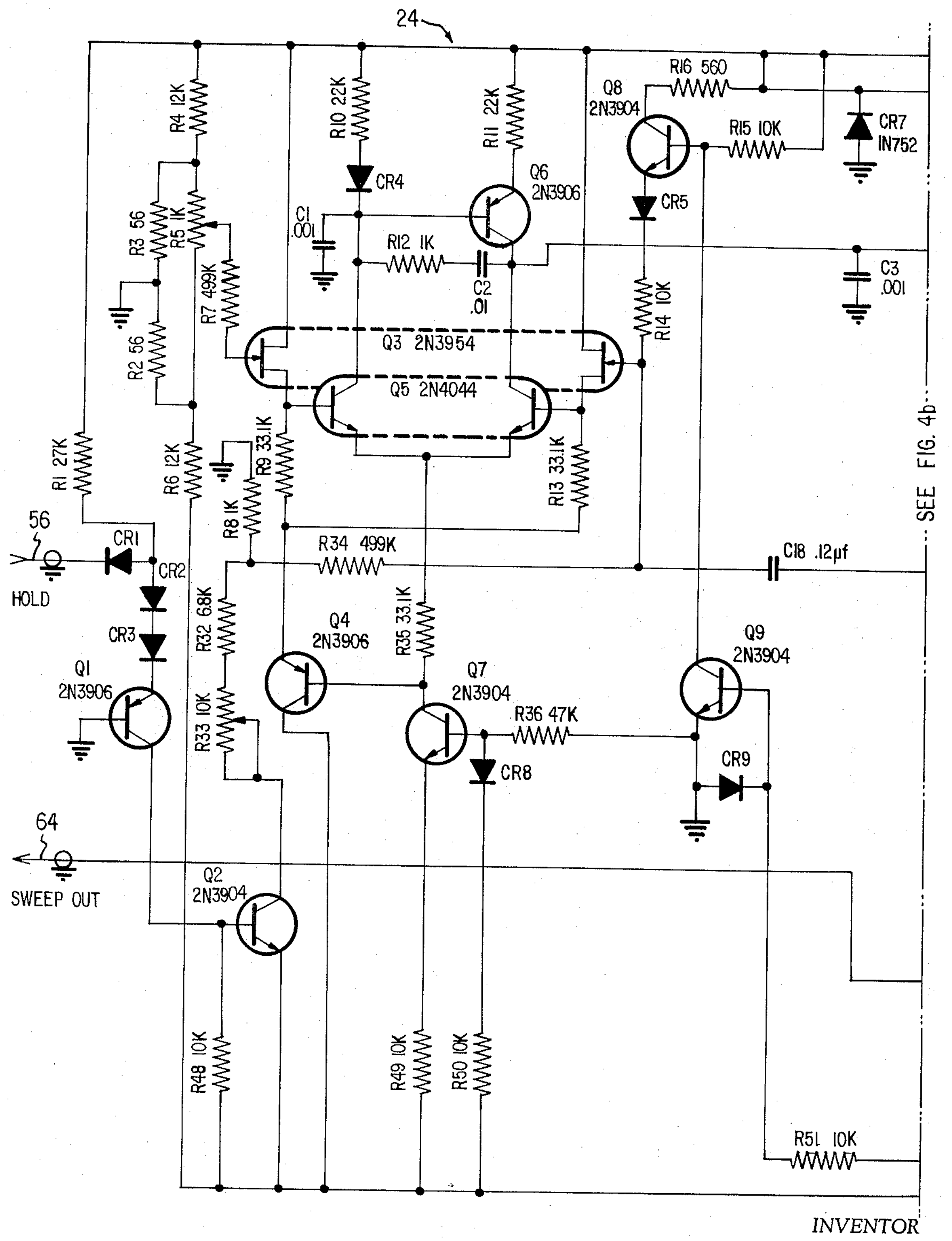
Figure 4B:
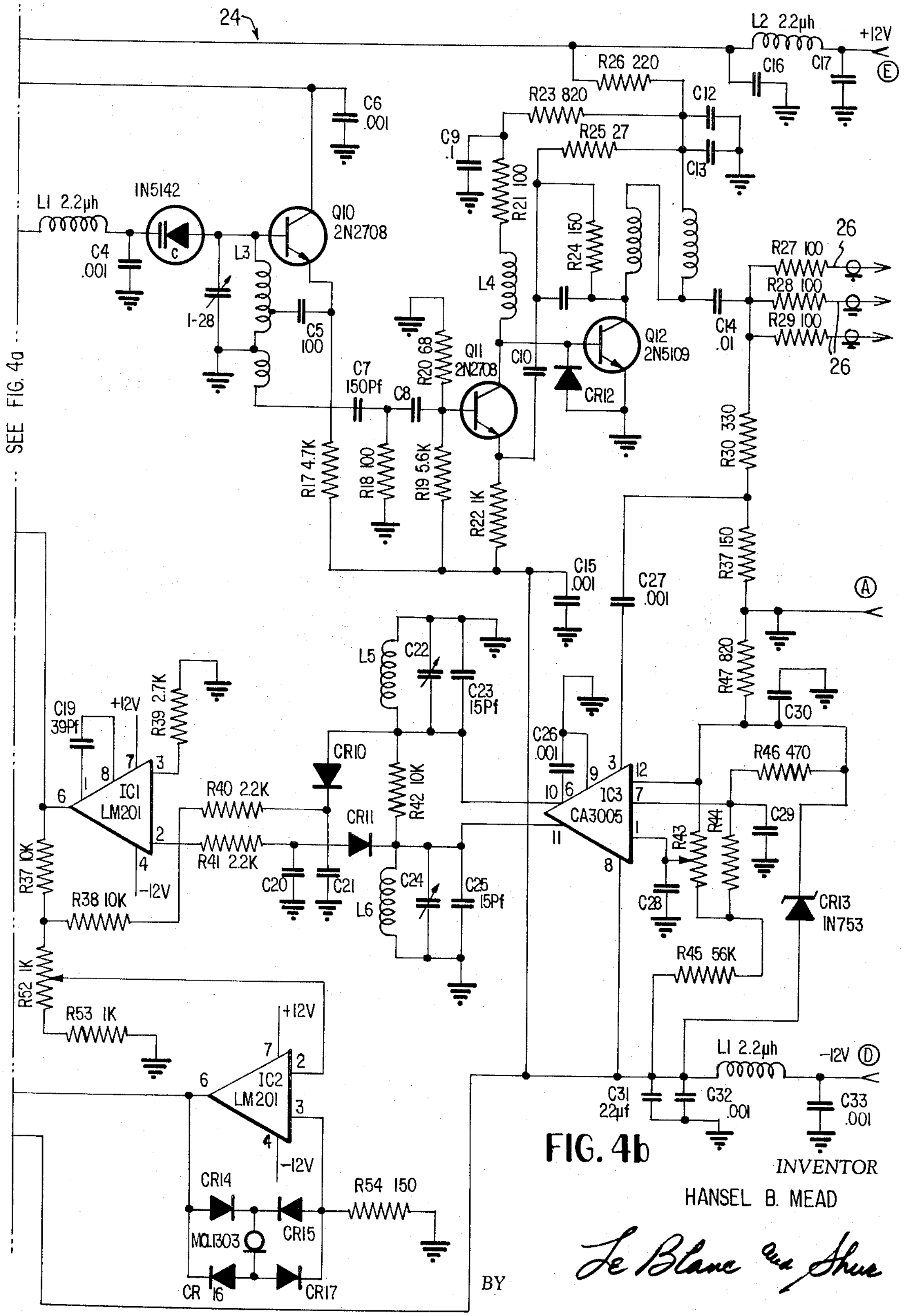
Figure 6:
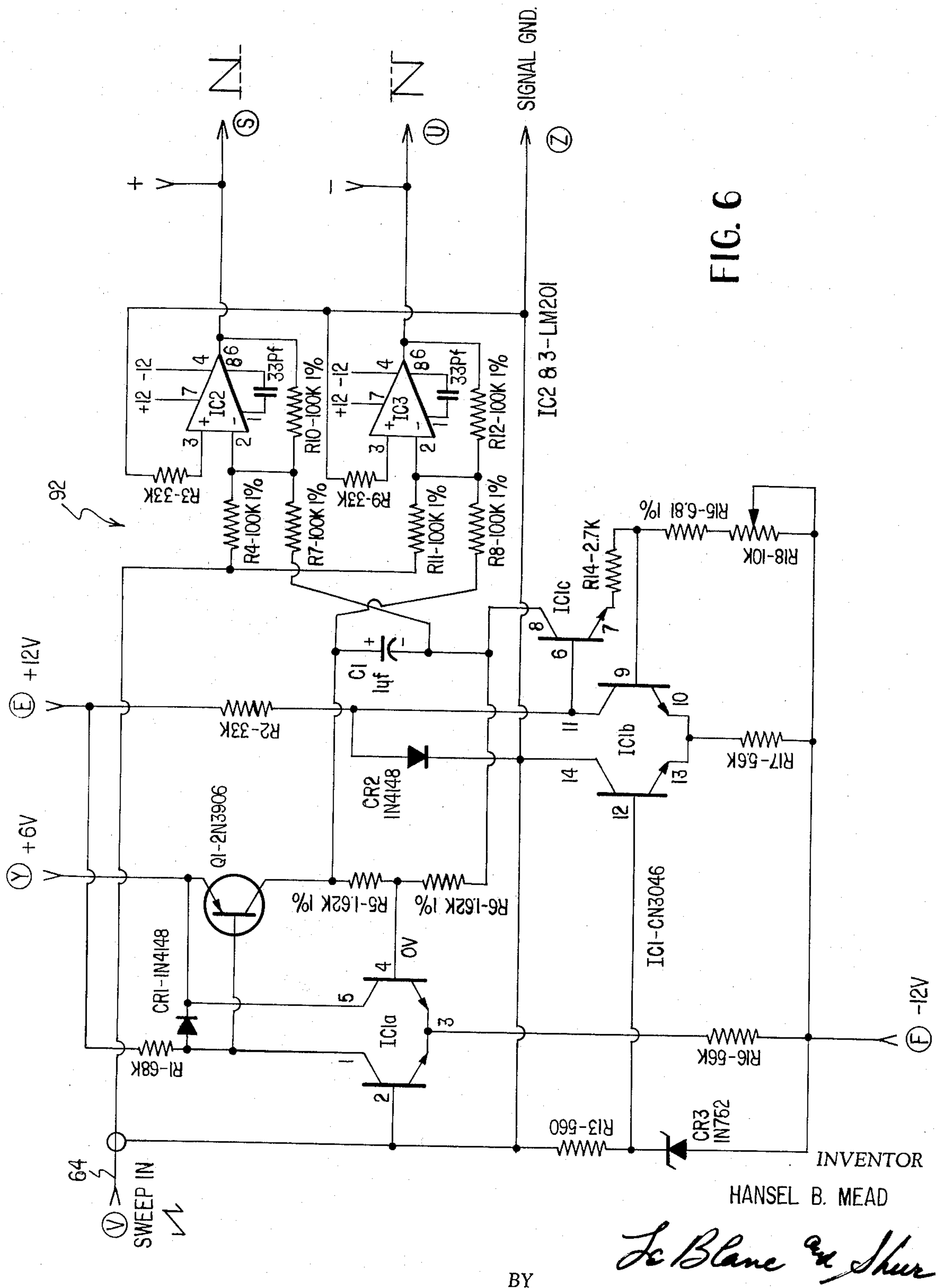
Figure 7:
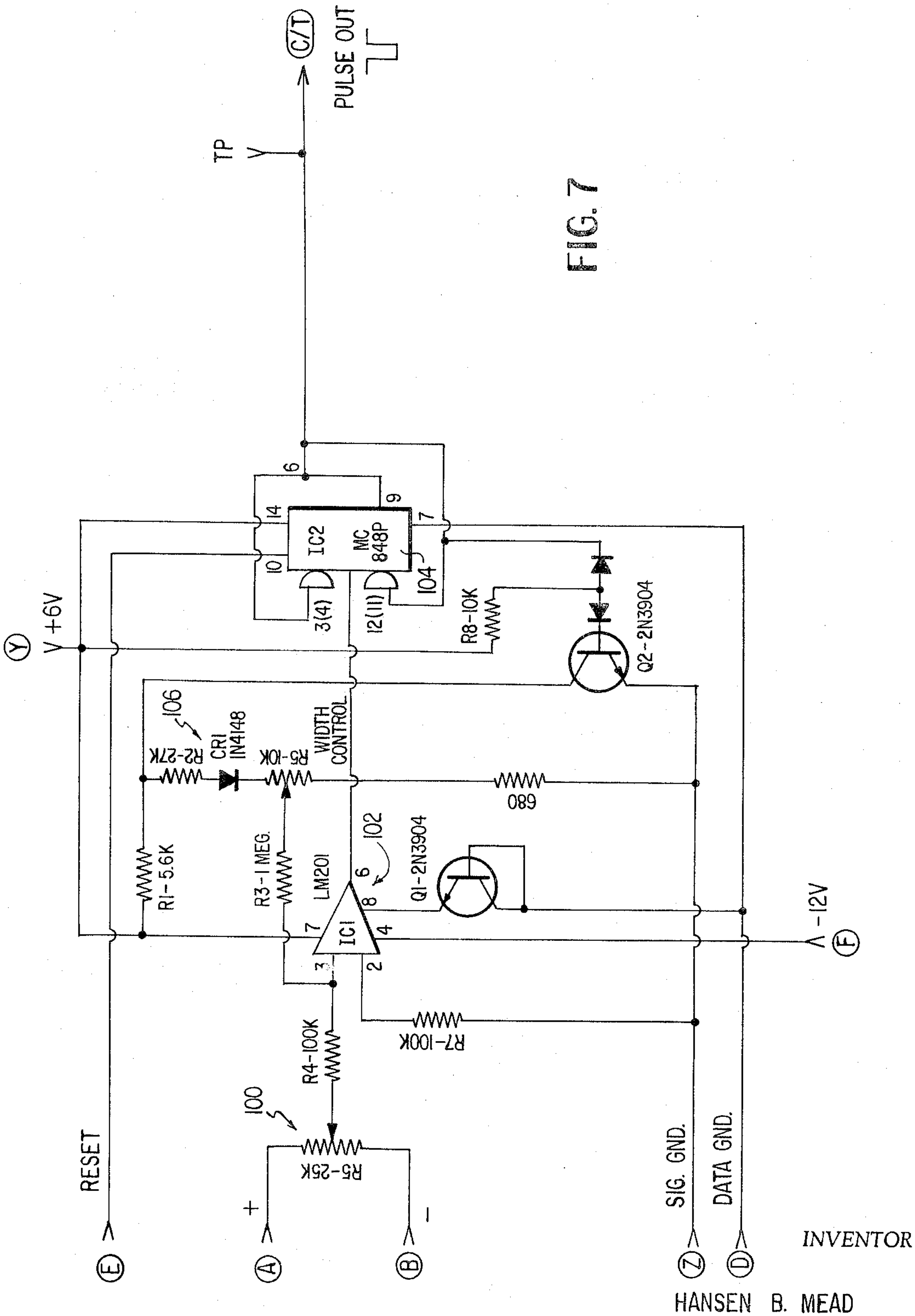
Figure 8:
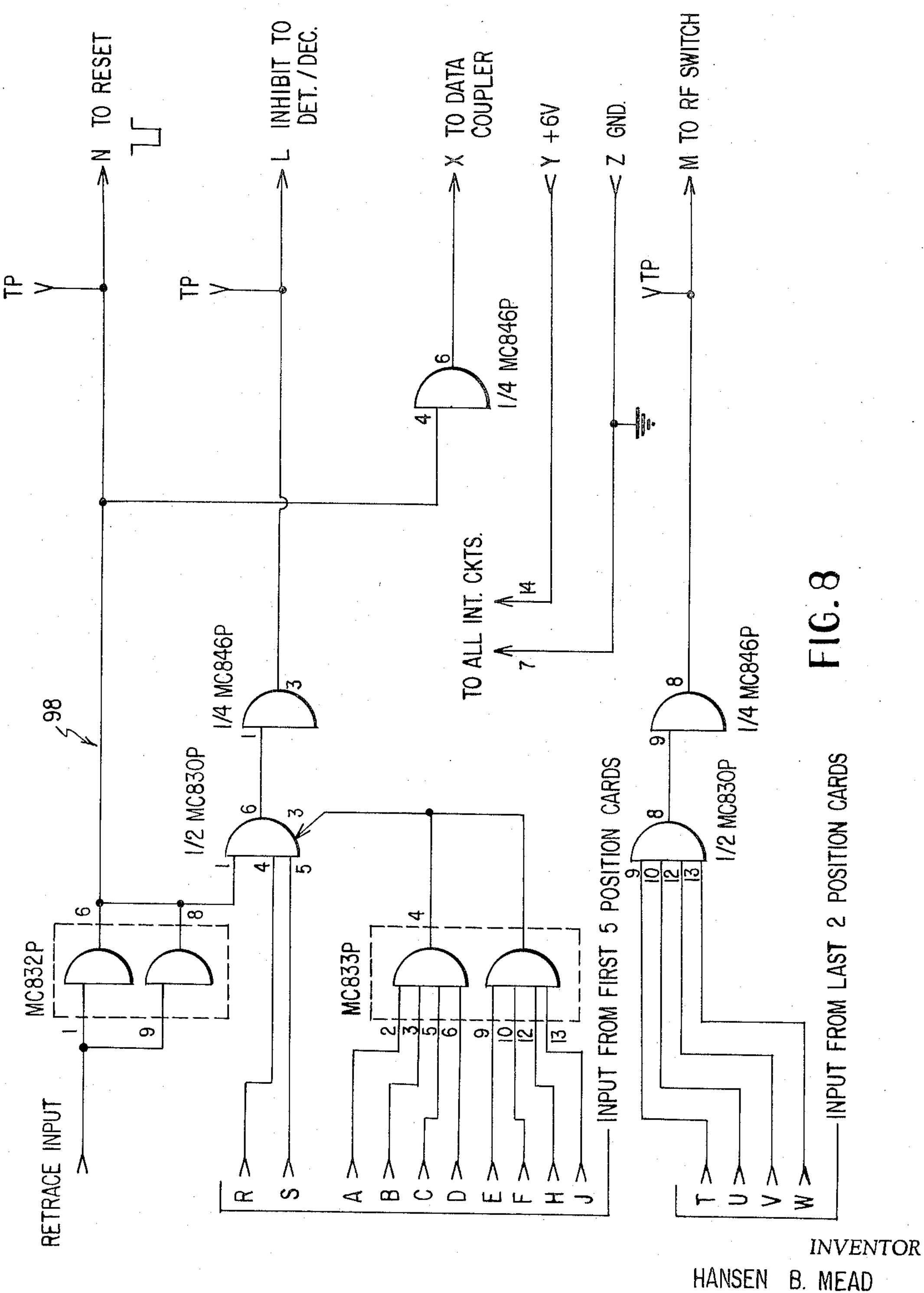
Figure 9:
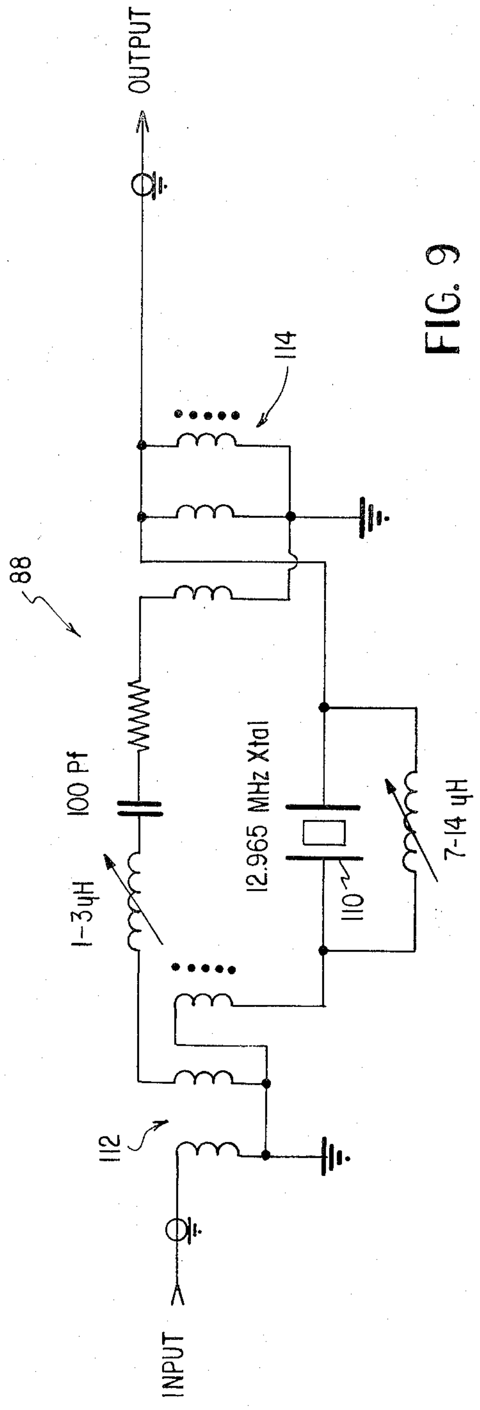
Figure 9A:
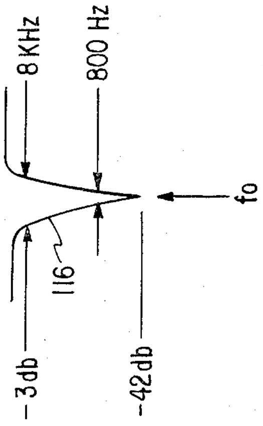
Figure 10:
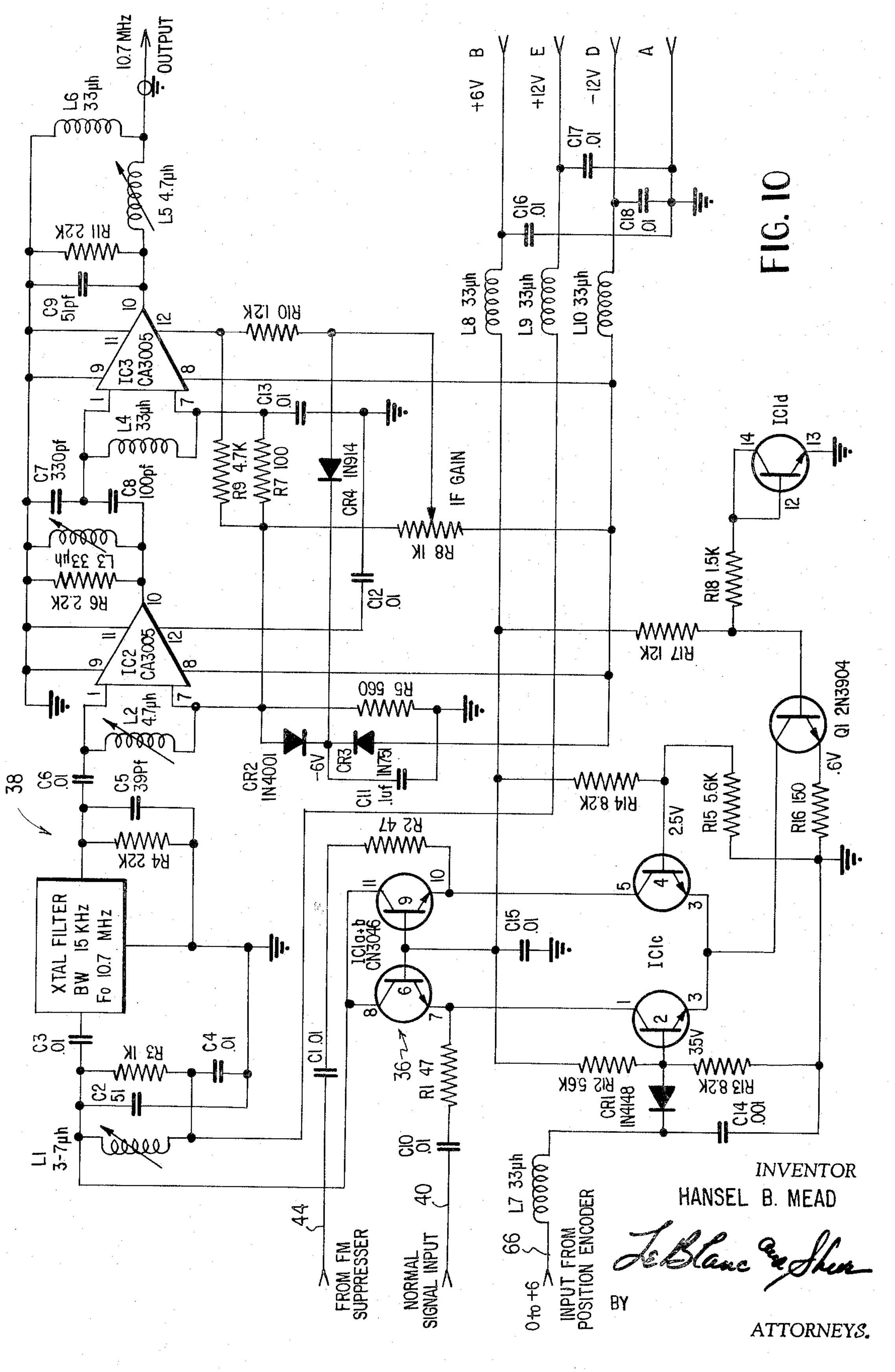
Figure 11:
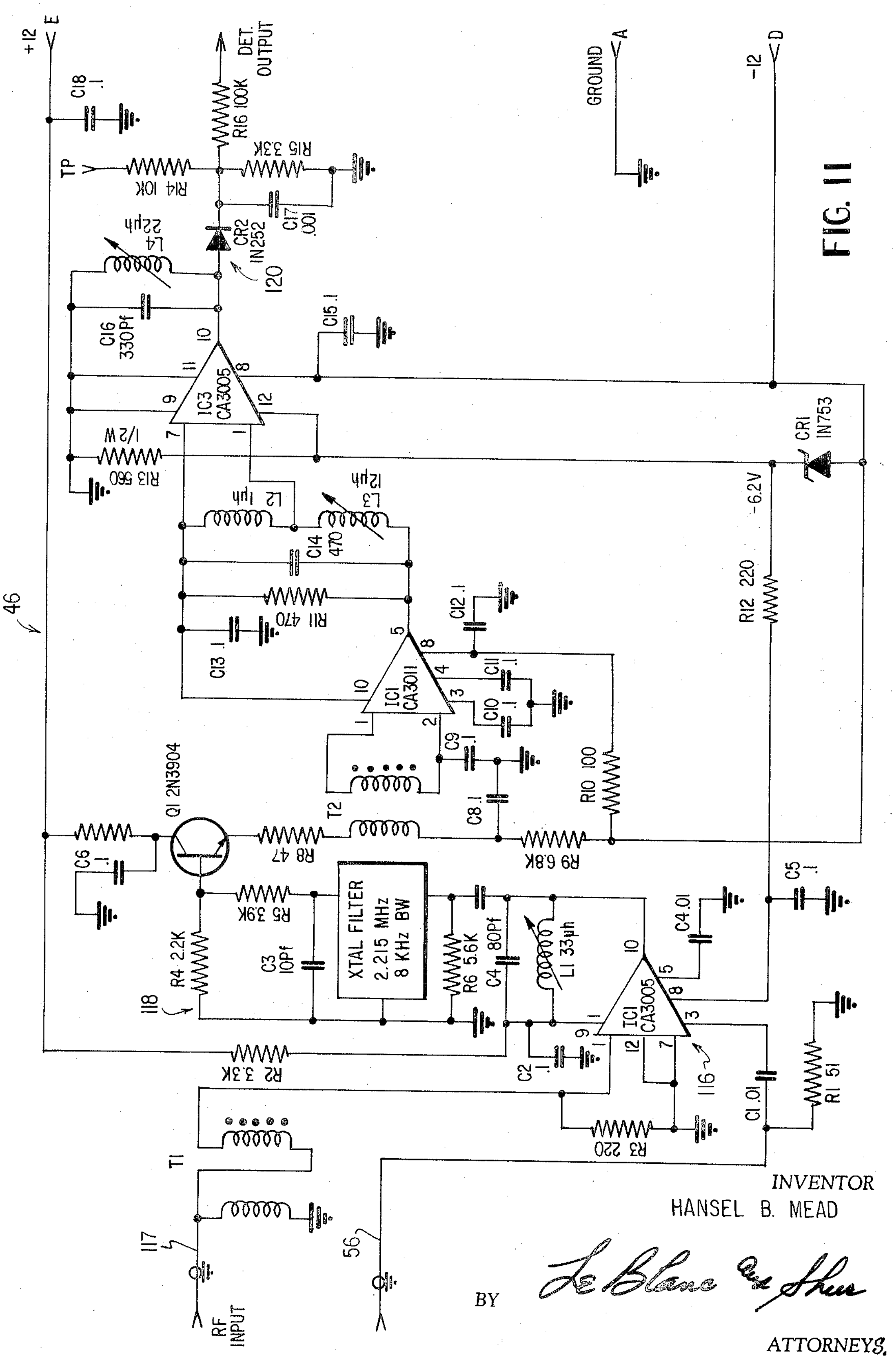
Figure 12:
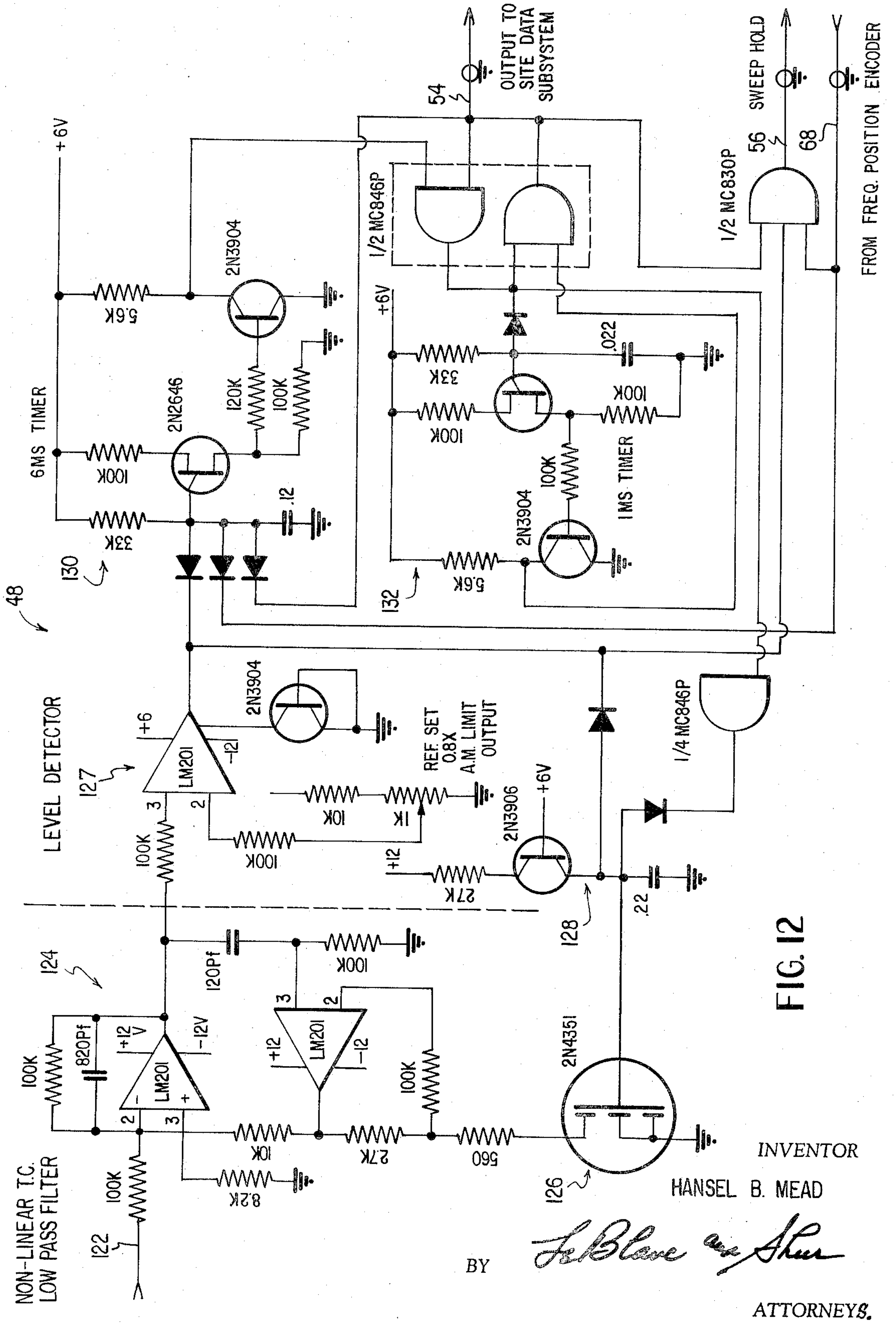

FIGS. 4*a* and 4*b* show a separate circuit diagram of the swept voltage controlled oscillator forming a part of the system of FIG. 1;

FIG. 5 is a block diagram of a frequency position encoder incorporated in the system of FIG. 1;

FIG. 6 is a circuit diagram of the frequency position encoder bias and drive;

FIG. 7 is a circuit diagram of the frequency position encoder position circuit;

FIG. 8 is a circuit diagram of the frequency position encoder gate circuits;

FIGS. 9 and 9A show a circuit diagram and response curve of a 12.965 MHz notch filter incorporate in the FM signal suppressor of FIGS. 1 and 2;

FIG. 10 is a circuit diagram of an RF switch and 10.7 MHz IF amplifier incorporated in the system of FIG. 1;

FIG. 11 is a circuit diagram of a 8 KHz filter, IF amplifier, limiter and detector incorporated in the system of FIG. 1; and FIG. 12 is a circuit diagram of the decision and control logic circuit forming a portion of the system of FIG. 1.

Referring to the drawings, a television audience survey monitor constructed in accordance with the present invention is generally indicated at 10 in FIG. 1. The monitor is adapted to be mounted on a tower in a metropolitan area to provide a substantially unobstructed path for the transmission of local oscillator signals from a large number of television sets in the area of the monitor to the monitor antenna 12. Antenna 12 is connected to a plurality of monitor channels, such as the channel 14, labeled channel No. 2, and additional channels labeled channel No. 3 and Channel No. N, indicated by dashed lines at 16 and 18, respectively. Only a single channel 14 of the monitor is shown in detail, it being understood that the other channels may be of identical construction with the exception that the initial channel filters are such that the channels pass a different band of local oscillator signal frequencies. Alternatively, channel 3 may be identical to channel 2 (except for the frequency band) where FM interference is most severe while the remaining channels may be constructed in the manner disclosed in assignee's U.S. Pat. No. 3,456,192. Channel 14 passes local oscillator signals from television sets tuned to channel 2 of a television station, channel 16 passes local oscillator signals from sets tuned to channel 3, and so on through as many channels as there are television station channels whose listening audience in the area of antenna 12 is to be ascertained. The purpose of the monitor is to count the number of local oscillator signals in each frequency band which gives a good indication of the number of television receiving sets tuned to the channel represented by that band. In FIG. 1, the various monitor channels are illustrated as connected to a common antenna 12, but it is understood that in certain instances it may be desirable to provide separate antennas for one or more of the monitor channels where the differences in frequency of the local oscillator signals warrent it. For example, it may be desirable to provide separate antennas for the VHF and UHF channels of the monitor.

Channel 14, which is at least typical of channel 16, comprises a preamplifier 20 with special filters to pass the frequency band of local oscillator signals corresponding to those TV sets tuned to television channel 2. The filters in preamplifier 20 typically provide a reception band having a width of approximately 3.5 MHz which contains substantially all of the local oscillator frequency signals from sets tuned to channel 2. From preamplifier 20, the local oscillator signals pass to a preselector/mixer 22 where the local oscillator signals are mixed with the output signals from a swept local oscillator 24 supplied to the mixer by way of lead 26. The output from preselector/mixer 22 on lead 28 is supplied to a filter 30 having a center pass frequency of 10.7 MHz and a band width of 400 KHz. The output from this filter is applied to a distribution amplifier 32 and power splitter 34.

Depending upon the condition of an RF switch 36, the signal from power splitter 34 passes through the switch to a filter 38 having a 10.7 MHz center frequency and a band width of 15 KHz from switch input lead 40 or from power splitter 34 through FM signal suppressor 42 and by way of lead 44 through switch 36 to filter 38. From filter 38 the signal passes to a filter, IF amplifier and limiter 46 having a band width of 8 KHz and the output is applied to a detector and decision logic circuit 48 and from here to a data accumulator and transfer circuit 50. Data is transferred out of accumulator 50 under the control of a transfer control signal applied to input 52 and is transferred out of the circuit to a suitable register or display device by way of output lead 54.

Decision logic circuit 48 supplies an output by way of lead 56 which acts as a sweep hold signal to swept oscillator 24 which causes the oscillator to hold frequency or stop the sweep for a predetermined time when a local oscillator signal is centered in the frequency slot or window of the channel 14. A signal is taken from the sweep retrace output of local oscillator 24 and connected by way of lead 58 and is applied as an input to data accumulator and transfer circuit 50 to indicate the end of the sweep cycle. The retrace signal is also supplied by lead 60 to a frequency position encoder 62; the oscillator sweep output is applied by lead 64 to encoder 62, the latter supplying switch control signal by way of lead 66 to RF switch 36 which controls the positions in the sweep when FM signal suppressor 42 is switched into and out of the channel. Frequency position encoder 62 also supplies a signal by way of lead 68 to the detector and decision logic circuit 48 for conditioning, i.e., blanking the channel at predetermined portions of the oscillator sweep.

The operation of the detection process is based on the principle that the TV local oscillator signal is a narrow band coherent signal, while the FM signals and impulse noise are not. The FM signal does, in fact, behave like noise to the system detector. The advantages are that the detector can process TV local oscillator signals contained in the spectrum of the FM signal; that is, the system can work into the side bands of the FM signal while inhibiting a good deal less of the spectrum than in previous constructions. The portions of the spectrum that still must be inhibited are a function of the strength of the FM signal, whether the FM signal has mono or stereo modulation, and other factors.

As previously described, the CW (local oscillator) signals appear in the window for 1.0 msec., assuming a window width of 8 KHz, a scan spectrum of 3.5 MHz, and a sweep speed of a swept oscillator of 8 KHz per msec. With the response time of the detector/decision circuit including delay of 0.5 msec., the sweep is stopped 0.5 msec. after the CW signal has appeared in the window. A timer starts during this hold and if the CW signal remains in the window for 6 msec., the decision circuit renders a count and commands the sweep to start tuning to the next signal. If the signal does not remain in the window for 6 msec., and everything is cleared, the sweep starts and no count is registered. The length of time of a complete scan is a function of how many times and for how long the sweep was in the hold condition. Impulse noise rarely lasts over 3 msec. and this puts the sweep in hold but does not register a count.

FM signals act somewhat differently since the signal frequency is deviated around a center frequency by the modulation information. The amount of deviation is a great deal more than the width of the receiver window and the FM deviation is never constant. Thus, as the window tunes into the edge of an FM signal spectrum, the signal will be moving in and out of the window at a fast rate. At first the rate is faster than the 0.5 msec. response of the detector and as it tunes closer to the center, the FM signal begins causing the sweep to hold but not long enough to register a count. The closer the window moves toward the center of the FM spectrum, the longer the FM signal remains in the window until it reaches a place where the channel can no longer process and by command from the frequency position encoder 62 by way of lead 68 to the detector and decision logic circuit 48, this region is ignored or inhibited.

Should a CW television local oscillator signal be located in the spectrum of the FM signal, it would remain in the window for the 6 msec. and be counted. Now, as the FM signal pops through the window during the time the system is processing a TV local oscillator signal, they will beat together and a marginal local TV local oscillator signal (weak) could sometimes be missed. The filter in the detector/decision circuit 48 is designed to minimize this problem as more fully discussed below. However, it is apparent that the signal strength of the FM signal does affect the amount of inhibiting required and the receiver must display fast recovery characteristics to the strong FM signals popping in and out of the pass band window.

The FM signal suppressor 42 is switched in by the frequency position encoder 62 supplying a signal by way of lead 66 to RF switch 44. The suppressor is switched in when the sweep reaches a frequency coinciding with larger strength FM signals. The FM suppressor complements the variable rate sweep since it reduces the signal strength of FM signals while having little affect on smaller CW signals. The suppressor reduces the carrier by some 40 db while reducing the far outside bands by some 25 to 30 db. By switching in the suppressor 42 while processing in the spectrum of a large FM signal, it is possible to significantly reduce the error and lessen the amount of required spectrum that must be inhibited.

FIG. 2 is a block diagram of the FM signal suppressor 42 of FIG. 1. Power splitter 34 is shown in dashed lines in FIG. 2. In the power splitter, the signal is split into two paths, a first path comprising limiter 70 having a 10.7 MHz center frequency and a 1 MHz band width, a mixer 72, a crystal controlled oscillator 94, also feeding mixer 72, a band pass filter 76 having a center frequency of 23.66 MHz and a 2.5 MHz band width, an amplifier 78, and a mixer 80 having its output connected to lead 44. The other path of power from splitter 34 is through band pass filter 82 which acts as a time delay equalizer having a center frequency of 10.7 MHz and a 700 KHz band width, a mixer 84, a band pass filter 86 having a 12.965 MHz center frequency, a 2.6 MHz band width, and a trap centered at 34.86 MHz. From filter 86 the other power splitter branch passes through a band stop filter 88 to mixer 80. Filter 88 has a band width of 8 KHz and a power drop of 40 db. at its center frequency.

Suppressor 42 is constructed as a feed forward system. This circuit uses a tracking technique of the large signal to hold its output centered in a notch filter. This process attenuates a portion of the spectrum, depending on the width of the notch filter. In operation, the signal is split in the power splitter between the two paths previously described. Limiter 70 is a limiter with good capture characteristics and the output of the limiter is a constant amplitude signal with a frequency the same as the larger FM signal. This is mixed in mixer 72 with a constant frequency crystal oscillator output from oscillator 74 translating the frequency to a 23.66 MHz band. Therefore, the 23.66 MHz signal has the same FM characteristics as the incoming signal except that the center frequency has been translated up. This 23.66 MHz signal is then mixed in mixer 84 with the other incoming signal from the other arm of the signal splitter or power splitter 34. The output of mixer 84 has a constant frequency at the frequency of crystal oscillator 74. A small TV local oscillator signal in the spectrum now displays the FM characteristics of the FM signal. This composite signal is passed through band stop filter 88 rejecting the very narrow frequency band the same as the crystal oscillator frequency. This reduces the amplitude of the larger signal by the attenuation (40 db.) of the band stop filter. The output of the band stop filter is then mixed with the 23.66 MHz signal in mixer 80, recreating the spectrum as it was with the exception that the large signal has been reduced in amplitude. The same TV local oscillator signal will have low level amplitude modulation on it caused when it was frequency modulated through the band stop (notch) filter 88.

Figure 3:
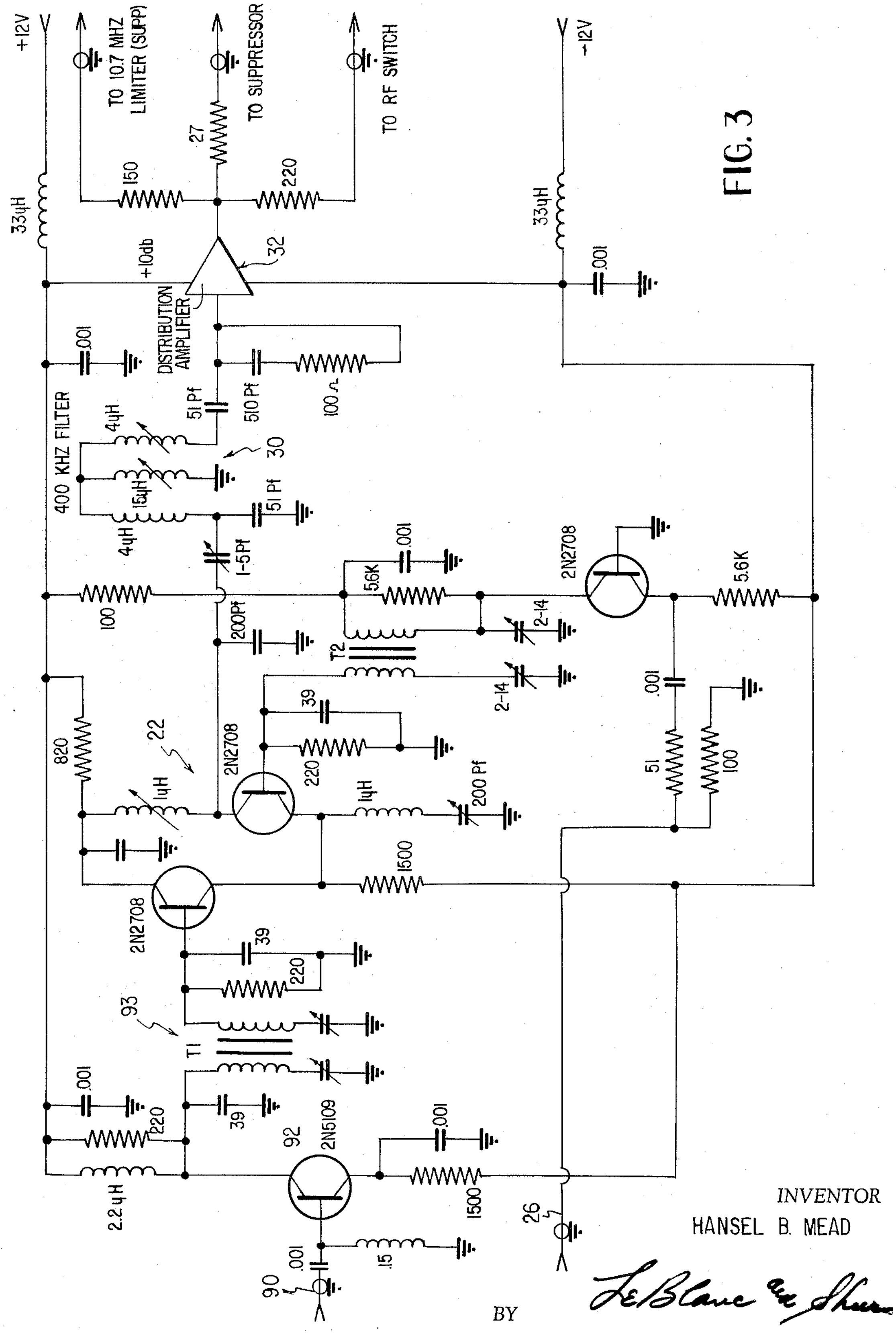
FIG. 3 is a circuit diagram of a preselector/mixer forming a part of the system of FIG. 1.

FIG. 3 is a detailed circuit diagram of the preselector/mixer/signal distribution amplifier illustrated in FIG. 1. The signal from the local oscillator appears on lead 26, while the signal from the preamplifier 20 is applied to lead 90. Transistor 92 is incorporated to provide gain ahead of the preselector two-pole filter 93. This band pass filter sets the channel pass band and has a flat response over a 4 MHz band width. The unit exhibits a 1 db. gain compression at −12 dbm input. The mixer output is a 10.7 MHz signal and drives a three-pole minimum ripple Tschebyscheff filter 30. This filter has a 400 KHz band width and couples to the distribution amplifier 32. The circuit displays wide band width (150 MHz) with large signal handling capabilities (+18 dbm out). Its output is split with resistive dividers to drive the suppressor and RF switch. The ratio of the divider normalizes the gain so that the gain through the suppressor is the same as through the normal receiver mode of operation.

FIG. 4 is a detailed circuit diagram of the swept local oscillator 24 of FIG. 1. This oscillator circuit is the same basic construction as that disclosed in assignee's U.S. Pat. No. 3,493,883 and will not be described in detail. One modification is that the sweep oscillator 24 includes the addition of a holding circuit to hold the sweep oscillator frequency at any position in the scan cycle. Basically, the oscillator is a voltage controlled oscillator controlled by a linear discriminator. The feedback of the discriminator is through an operational amplifier to the voltage controlled oscillator with a coupling capacitor. The precise frequency range of sweep is controlled by the circuit utilizing positive feedback. The slope of the scan is controlled by the bias on the integration operational amplifier. If this amplifier is properly balanced, removing this bias will stop the sweep or be at 0.0 slope. Thus, the holding circuit digitally switches the bias in or out. The retrace bias comes from a different source so the retrace occurs independently of this scan bias. Retrace is commanded from the slope level detector utilizing a hysteresis characteristic. The swept oscillator has three outputs: the RF signal output is used as the local oscillator to the mixer, the discriminator output is the sweep output and is a voltage proportional to the output RF frequency of the oscillator and this appears on lead 64, and an output retrace impulse signals the end of a scan.

FIG. 5 is a block diagram of the frequency position encoder 62 of FIG. 1. The frequency position encoder 62 comprises bias and drive circuits 92, position encoder cards 94, a gate expander 96, and gating circuits 98. The bias and drive circuits 92 are illustrated in FIG. 6. FIG. 7 shows one of the circuits on a typical position encoder card 94, and FIG. 8 shows the details of the gating circuits 98.

The frequency position encoder 62 derives digital outputs for various regions of frequency of the swept local oscillator 24. These outputs are supplied over lead 66 in FIG. 1 to switch the FM signal suppressor 42 and over lead 68 in FIG. 1 to condition the decision circuit 48 at known portions of the frequency band which are preprogrammed. The circuit uses a sweep input from lead 64 and a retrace input from lead 60 for operation. A bias and drive circuit card 92 accepts the sweep input which is a voltage proportional to the output frequency of oscillator 24. It has a different output for reference bias with the sweep riding on both outputs in a common mode. The output of circuit card 92 drives all the position circuit cards 94 in parallel. Each position card 94 contains two identical circuits supplying an output pulse over a certain voltage region of the sweep. One such circuit is illustrated in FIG. 7.

These circuits have two adjustable potentiometers, one controlling at what voltage of the sweep the pulse starts and the other over the voltage region it remains switched. The level detector is an integrated circuit operational amplifier referenced to ground. Because of the arrangement of the drive, the position potentiometer allows the sweep ramps to be positioned anywhere in the cycle referenced to ground. Therefore, one reference (differential from bias card) serves all position cards. The flip-flops on the position card are reset positive during retrace. At the beginning of the sweep, all level detector outputs are positive. Depending on where the potentiometers are adjusted controls where the level detectors will switch in the cycle. When the level detector switches, it toggles the flip-flop causing the output to go to zero. This action also switches a bias into the level detector by way of the width potentiometer causing the level detector to again switch positive because it changes the reference input. When the new reference level of the sweep is reached, the level detector again switches negative toggling the flip-flop output positive. This last described action, in conjunction with the width adjustment, controls the sweep span where the position circuits have an output.

The output of the position cards are connected into the appropriate gating circuits 98 on the gate cards one of which is illustrated in FIG. 8. The AND gates on the gating card 98 channel the position pulses to either the RF switch 36 or the decision circuit 48 of FIG. 1. The gating card 98 will accommodate fifteen inputs as indicated. If over 15 slots are needed, a gate expander card 96 (FIG. 5) can be used. The entire frequency position encoder 62 uses integrated circuits and the circuits are mounted on printed circuit cards using slide plug-in mounting in a separate 5 inch drawer. Logic elements are standard DTL 930 series using +6 volt level.

FIG. 9 is a circuit diagram of the notch filter 88 shown in FIG. 2 as incorporated in the FM signal suppressor 42 of FIG. 1. The notch filter is illustrated as incorporating a crystal 110 of the series mode type resonating at 12.965 MHz. By incorporating the crystal in a bridging circuit with toroidal transformers 112 and 114, an attenuation of 42 db. was attained in the band stop center. The 3 db down points were 8 KHz wide, as illustrated at 116 in FIG. 9A.

FIG. 10 is a detailed circuit diagram of the RF switch 36 of FIG. 1 and the 10.7 MHz filter and IF amplifier 38. These components are housed in a single RF module and all active elements utilize R.C.A. linear integrated circuits. The switch 36 is a differential current switch feeding a common base RF differential amplifier. The common base amplifier collectors tie together in common to drive the 10.7 MHz crystal filter in element 38. The R.C.A. 3046 transistor array displays high gain band width and good matching between elements. This unit measures 65 db of isolation between the "on" and "off" port. Also the switching pedestal does not show up in the RF output because of the balanced configuration.

The 10.7 MHz IF filter is a C.F. network standard component and is provided to achieve as much resolution as possible to large FM signals. The 15 KHz band width filter is chosen because it has 60 db/3 db skirt of 1.3:1 with over 100 db ultimate attenuation. The filter is followed with the R.C.A. 3005 integrated circuit amplifier to supply gain at 10.7 MHz. These circuits recover instantly from overload and are the same units as used in the earlier described limiter in the FM signal suppressor. A coarse gain control is mounted on this module operating on the C.A. 3005 integrated circuits.

FIG. 11 is a detailed circuit diagram of the 8 KHz filter, IF amplifier and limiter 46 of FIG. 1 and the detector forming a portion of element 48 in FIG. 1. The 10.7 MHz input on lead 117 from element 48 in FIG. 1 is mixed down in an integrated circuit C.A. 3005 mixer 116 to 2.215 MHz. In the output of this mixer is a 2.215 MHz crystal filter 118 with 8 KHz of band width. This filter sets the predetection band width of the monitor channel 14 and forms the band pass window or moving frequency slot previously described. This filter does not have skirts as sharp as does the 10.7 MHz crystal filter, but has better impulse response. The IF amplifier/limiter has one C.A. 301 integrated circuit and one C.A. 3005 integrated circuit which supply a limited output at −50 dbm or above. The output of the limiter drives an amplitude detector in element 48 indicated at 120 in FIG. 11. This limiting action normalizes all the signal outputs to a level of 1 volt if they are larger. The integrated circuits again have fast recovery and this allows the output to settle down after overload limited only by the crystal filter response time. The fast recovery is important for proper operation in the FM spectrum.

FIG. 12 is a detailed circuit diagram of the decision and control logic circuits of element 48 in FIG. 1. The output from the AM detector of FIG. 11 is applied to input lead 122 in FIG. 12. This signal is filtered by a low pass video filter 124. Filter 124 is of an unconventional design because it has the property that its time constant (TC) or roll-off can be electrically adjusted without affecting its DC gain. This is accomplished by adjusting gain of transfer feedback with a MOS field effect transistor 126. The time constant goes from 0.25 msec to 1 msec during control. The output of the low pass filter 124 is monitored by a level detector 127. The level detector threshold setting is at 0.8 times the AM limited output. Starting at T = 0, a signal appearing above 0.8 times the limited output will actuate the level detector delayed by the low pass filter for 25 msec. After the level detector output goes positive, integrator 128 starts moving the MOS gate positive, causing the time constant of the low pass filter to increase. Because of the nonlinear transfer function of the MOS 126, nothing changes appreciably until after 3 msec. (log function), whereas the time constant begins to increase.

The output of level detector 127 also starts a 6 msec. unijunction timer 130. The level detector positive output also puts the sweep in hold by way of output lead 56. If the AM output remains above threshold for 6 msec., timer 130 triggers a monostable 132 with a 1 msec. time constant. This monostable output is a count output on lead 54. It also discharges the 6 msec. timer 130, grounds the gate of MOS 126, and starts the sweep after 1 msec. This 1 msec dead time clears all logic and any signal from the 8 KHz/msec. pass band.

If the AM signal drops below the threshold setting for a longer period than the low pass filter time constant, this will cause the level detector output to zero, clearing the 6 msec. timer 130, causing the MOS input to discharge and starts the sweep. A marginal signal around the threshold setting in the presence of noise can cause this to happen. Increasing the time constant of the low pass filter minimizes this. However, the time constant must be relatively fast to stop the sweep in the required time. The longer the signal is in the pass band, the higher the confidence level that it may be a legitimate signal, and the less desirable it is to dismiss it because of noise. Thus, the self-adjusting of the time constant of the low pass filter 124 helps overcome the undesirable effect since increasing this time constant smooths the fast transitional components of noise. The input from the frequency position encoder on lead 68 inhibits all functions of the band spread near the center of the FM spectrum.

The remaining components of channel 14 illustrated in FIG. 1 are of conventional construction and of the type shown and described in more detail in assignee's U.S. Pat. No. 3,456,192. The data accumulator 50 in FIG. 1 comprises a conventional data compiler in combination with two Hewlett Packard event counters. This circuit accumulates the number of counts per single sweep and the length of sweep time in 0.01 sec. readout. This is a simple circuit using IC, DTL logic. An external switch is used to preset a two-stage shift register. With the next retrace of the system sweep, a gate is open between decision circuits and counters. Also at the same time, a 100 Hz oscillator is started connected to another counter. At the next retrace pulse, the gate is closed and the oscillator stopped. Data is recorded from the counters, which are manually cleared and the process repeated.

It is apparent from the above that the present invention provides an improved television audience survey monitor having increased insensitivity to the adverse affects of strong FM signals, particularly a problem due to the overlap of the lower channels, i.e., monitor channels 2 and 3, with commercial entertainment FM frequencies. Important features of the present invention include the combination of a single window for the receiver channel which is swept at a variable rate, i.e., is continuous until a signal is sensed and then stopped for a predetermined time in order to register a count. The variable rate sweep is used in conjunction with an FM signal suppressor making it possible to work closer in on the FM side bands. It is, however, understood that the frequency position encoder 62 still provides some inhibiting or blanking when working directly into the strongest FM signals but the variable rate sweep, in combination with the FM signal suppressor, minimizes those frequencies of the sweep which must be blanked or inhibited so that a greater number of more accurate counts of local oscillator signals is obtained.

A signal channel filter/IF-limiter/AM detector is used as a single moving window of a constant rate sweep that is periodically stopped when a signal is sensed. Each channel using the variable rate sweep has its own swept local oscillator 24 which is electronically controlled to sweep or hold anywhere in the scan cycle. The FM signal suppressor 42 is constructed so that it can be switched into the channel at appropriate frequencies to further suppress large FM signals. The frequency position encoder 62 is used to control the switching of the FM signal suppressor and to condition the detector/-decision logic, i.e., completely blank and inhibit for processing in the strongest spectrum of an FM signal.

As previously mentioned, the improved channels of the present invention are particularly suited for use in accumulating data in monitor channels corresponding to television channels 2 and 3. The remaining channels of the monitor may be of the same construction or, alternatively, may be of the double window type shown and described in assignee's U.S. Pat. No. 3,456,192. In all instances, the local oscillator signals are separated into different channel bands by the preamplifier and filter 20 which is different for each channel in that it passes a different frequency band through the channel. This is, channel 3, illustrated at 16 in FIG. 1, and any other channel using the variable rate sweep of the present invention, is identical to channel 14 shown and described in detail with the exception that the preamplifier filters of element 20 of these additional channels passes a different band of frequencies and the swept local oscillator of these channels are swept over a frequency band correspondingly different to produce an output from the mixer corresponding to mixer 22 having a center frequency of 10.7 MHz. With the exception of the frequencies passed through preamplifier 20 and the corresponding different sweep band for oscillator 24, it is understood that channel 16 in FIG. 1 and any other channels employing the variable sweep rate are otherwise identical to channel 14. Information may be transferred out of the data accumulators 50 of the various channels either in sequence or simultaneously, as desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a receiving set monitor having a mixer and a swept local oscillator coupled to said mixer for comparing the frequency of incoming signals with the frequency of said oscillator, means coupled to said oscillator for causing the sweep of the oscillator to stop when the frequency of an incoming signal is in a predetermined pass band, means coupled to said oscillator for restarting said oscillator sweep after said signal has been in said pass band a predetermined length of time, a receiving channel in said monitor coupled to said oscillator, an FM signal suppressor coupled to said receiving channel for suppressing large FM signals passing into said channel, and means coupling said oscillator to said suppressor for switching said suppressor into said channel at predetermined places in a sweep cycle of said oscillator.

2. Apparatus according to claim 1 wherein said switch means comprises an RF switch coupling said suppressor to said channel, and a frequency position encoder coupling said oscillator to said RF switch.

3. Apparatus according to claim 1 including means for supplying a sweep voltage from said oscillator to said position encoder whereby said encoder produces an output in response to the magnitude of said sweep voltage.

4. A monitor for ascertaining the listing habits of radio and television users comprising a plurality of channels for passing different bands of frequencies approximately three to four megahertz wide, at least one of said channels comprising a mixer, a swept oscillator coupled to said mixer for mixing the incoming signals with the swept output of said oscillator, a filter and detector coupled to the output of said mixer, means for supplying a sweep hold signal from said detector to said oscillator whereby the oscillator sweep is stopped when a signal passing through said filter is detected by said detector, an FM suppressor, and means in said one channel coupling said oscillator to said suppressor for switching said suppressor in and out of said one channel when the swept output of said oscillator is at predetermined frequencies.

5. A monitor for ascertaining the listing habits of television users comprising a signal input, a plurality of channels including frequency seclection means coupled to said input for passing different bands of frequencies into said channels, at least one of sid channels comprising a mixer, a swept oscillator coupled to said mixer for mixing the incoming signals from said signal input with the swept output of said oscillator, a band pass filter and a detector coupled to the output of said mixer, time delay means for supplying a sweep hold signal from said detector to said oscillator hwereby the sweep of said oscillator is stopped for a predetermined length of time when a signal passing through said filter is detected by said detector, means coupled to said detector and time delay means for recording a count when said signal has been detected by said detector for a predetermined length of time, a feed forward FM signal suppressor having a notch filter, an RF switch in said one channel for switching said suppressor into and out of said channel, a frequency position encoder coupling said oscillator to said RF switch, said detector including inhibiting means and means coupling an output of said frequency position encoder to said inhibiting means for inhibiting said detector when the output of said swept oscillator is at predetermined frequencies.

6. In a receiving set monitor having a mixer and a swept local oscillator coupled to said mixer for comparing the frequency of incoming signals with the frequency of said oscillator, means coupled to said oscillator for causing the sweep of the oscillator to stop when the frequency of an incoming signal is in a predetermined pass band, means coupled to said oscillator for restarting said oscillator sweep after said signal has been in said pass band a predetermined length of time, a receiving channel in said monitor coupled to said oscillator, and an FM signal suppressor coupled to said receiving channel for suppressing large FM signals passing into said channel.

7. A monitor for ascertaining the listening habits of television users comprising a signal input, a plurality of channels including frequency selection means coupled to said input for passing different bands of frequencies into said channels, at least one of said channels comprising a mixer, a swept oscillator coupled to said mixer for mixing the incoming signals from said signal input with the swept output of said oscillator, a band pass filter and a detector coupled to the output of said mixer, time delay means for supplying a sweep hold signal from said detector to said oscillator whereby the sweep of said oscillator is stopped for a predetermined length of time when a signal passing through said filter is detected by said detector, means coupled to said detector and time delay means for recording a count when said signal has been detected by said detector for a predetermined length of time, a feed forward FM signal suppressor having a notch filter, an RF switch in said one channel for switching said suppressor into and out of said channel, and a frequency position encoder coupling said oscillator to said RF switch.

8. In a receiving set monitor having a mixer and a swept local oscillator coupled to said mixer for comparing the frequency of incoming signals with the frequency of said oscillator, a detector and a decision logic circuit coupled to said mixer, means for supplying a sweep hold signal from said decision logic circuit to said oscillator, and a time delay circuit in said decision logic circuit for terminating said sweep hold signal after a predetermined length of time, said decision logic circuit including a filter having a variable time constant coupled to the output of said detector, and means coupled to said filter for varying its time constant in response to an output signal from said detector.

9. Apparatus according to claim 8 wherein said filter is a low pass video filter.

10. Apparatus according to claim 9 including a limiter coupled to said mixer, said detector comprising an AM detector coupled to the output of said limiter.

11. Apparatus according to claim 10 including a level detector coupled to the output of said filter, and means for feeding back a signal from said level detector to said filter for varying the time constant of said filter.

12. Apparatus according to claim 11 wherein said feedback means comprises means for increasing the time constant of said low pass filter in response to an output from said level detector.

13. Apparatus according to claim 12 wherein said feedback means comprises an MOSFET coupled between the output of said level detector and said filter.

14. Apparatus according to claim 13 including an integrator coupling the output of said level detector to the gate of said MOSFET.

15. Apparatus according to claim 14 wherein said means for supplying a sweep hold signal to said oscillator is coupled to the output of said level detector.

16. Apparatus according to claim 15 wherein said time delay circuit comprises a timer coupled to the output of said level detector.

17. Apparatus according to claim 16 including a count output coupled to the output of said timer, and means coupled between the output of said timer and said low pass filter for reducing the time constant of said low pass filter to its original value in response to an output from said timer.

* * * * *

FO-1050
(5/69)

UNITED STATES PATENT OFFICE
CERTIFICATE OF CORRECTION

Patent No. 3,800,223 Dated March 26, 1974

Inventor(s) Hansel B. Mead

It is certified that error appears in the above-identified patent and that said Letters Patent are hereby corrected as shown below:

In Column 1, line 26, "of the" should read --of that--; line 43, "tuing" should read --tuning--; line 60, "minotir" should read --monitor--.

In Column 2, line 33, "fo" should read --of--.

In Column 3, line 51, "incorporate" should read --incorporated--.

In Column 4, line 30-31, "warrent" should read --warrant--.

In Column 10, line 66, "signal channel" should read --single channel--.

In Column 12, line 30, claim 5, "sid" should read --said--.

Signed and sealed this 22nd day of October 1974.

(SEAL)
Attest:

McCOY M. GIBSON JR.
Attesting Officer

C. MARSHALL DANN
Commissioner of Patents